United States Patent Office

3,611,733
Patented Oct. 12, 1971

3,611,733
METHOD OF SEALING OPENINGS
Louis H. Eilers, Inola, and Christ F. Parks, Tulsa, Okla., assignors to The Dow Chemical Company, Midland, Mich.
No Drawing. Continuation-in-part of application Ser. No. 563,679, July 8, 1966. This application Oct. 6, 1969, Ser. No. 864,228
Int. Cl. C09j 3/04, 3/06; E02d 3/12
U.S. Cl. 61—36 R     8 Claims

ABSTRACT OF THE DISCLOSURE

An improved method of sealing off an opening, either temporarily or more-or-less permanently, to inhibit the passage of aqueous fluids which comprises emplacing in the opening a fluid aqueous salt-natural polymer composition which indigenously sets to a fluid-tight resilient solid having predetermined longevity dependent upon the pH value of the fluid composition.

---

This is a continuation-in-part of patent application, S.N. 563,679, filed July 8, 1966, now abandoned.

The invention concerns an improved method of sealing off openings in solid matter wherein such opening exists and its presence is undesirable for either a long or short time. The term "opening" as used herinafter refers broadly, inter alia, to any gap, fault, break, channel, passageway, port, fracture, crack, crevasse, fissure, interconnecting pores or cells, cavity or space, e.g. the annular space as may exist between a wellbore wall and a casing or liner or between a casing and tubing.

In our U.S. Pat. 3,306,870, issued Feb. 28, 1967, from application S.N. 371,665, filed June 1, 1964, there is described a gelable fluid composition and method of use wherein the composition consists essentially of an acrylamide polymer dispersed in an aqueous solution of one or more selected salts, the salt solution being of such nature and concentration that it has an aqueous tension (or vapor pressure) of not more than about 10 millimeters of mercury. The composition gels autonomously to form a fluid-tight water-swellable sealant which is highly effective against the passage of water and aqueous fluids.

The present invention is predicated on the discovery that natural materials of a more-or-less complex nature, of a class sometimes called natural polymers, when admixed with an aqueous solution of a selected metal salt, produce a fluid-gelable composition which autonomously converts to a strong resilient fluid-tight solid and which, when emplaced while in the fluid state in an opening sought to be closed, forms (upon indigenous gelation) in such opening a strong seal or plug which is highly resistant against fluid-flow therethrough. The permanence of the seal so made may be controlled to form a self-disintegrating seal after a period of usefulness has passed or, on the other hand if so desired, to form a more-or-less permanent type seal as hereinafter explained. The seal formed according to the invention is particularly useful in underground fluid-sealing operations including sealing off openings or passageways behind liners of shafts and casings of boreholes, and the like, more especially in salt domes wherein especially large diameter holes are employed as in conducting underground nuclear explosions.

The invention accordingly consists of the method of sealing openings wherein movement of water or an aqueous solution is to be inhibited especially in sealing between an earthen formation wall and the casing or liner of wells or between the formation wall and liner or shoring of shafts, tunnels, or the like, and, in general, sealing against the encroachment of water or aqueous solutions into the space around any underground installation comprising injecting or otherwise emplacing a fluid composition which sets or gels to a fluid-tight solid, consisting essentially of a selected natural polymer dispersed in an aqueous solution of one or more metal salts judiciously selected for its or their suitability, wherein the pH thereof is controlled to provide a durability of either a predetermined relatively short time or relatively long time, as desired.

The natural polymer employed is such that it can form a colloidal suspension in water and of which a 2% aqueous dispersion thereof has a viscosity of at least 10 centipoises. Only those polymers that disperse but never-the-less are insoluble to the extent that no more than about 5 grams thereof completely dissolve (as distinguished from forming a colloidal dispersion) in a 10% brine at room temperature and at a substantially neutral pH value are employed in the practice of the invention. It, therefore, has a relatively high molecular weight. Although the natural polymer to be used is sometimes referred to by high polymer chemists as "soluble," it is not truly soluble in water and is usually less soluble in brines, but does disperse therein to form substantially non-settling colloidal "solutions." The better term to use is water-dispersible and as used herein excludes truly water-soluble polymers.

The natural or modified natural polymers employable in the practice of the invention include substantially water-insoluble (as defined above):

Polysaccharides such as:
  starches,
  chemically modified starches;
Water-insoluble cellulose ethers such as:
  ethyl cellulose,
  hydroxyethyl cellulose,
  hydroxypropyl cellulose,
  hydroxyethyl methyl cellulose,
  hydroxyethyl ethyl cellulose,
  hydroxypropyl methyl cellulose,
  hydroxypropyl ethyl cellulose;
Gelatins and other proteins such as soybean flour (soya) or procase;
Natural gums such as:
  ghatti,
  tragacanth,
  karaya,
  guar,
  Irish moss,
  acacia,
  processed seeds,
  legumes, or
  lichens.

Unmodified starch is particularly effective and may be such as is produced from any known source which includes almost every living plant to some extent and especially from annual and biennial plants, e.g., grains, grasses, and tubers.

It is understood that mixtures of the above natural polymers are fully acceptable for the practice of the invention.

By chemically modified starches are meant those starches which have been treated to render them more readily water-dispersible by chemical or physical modification as by heating or by adding certain salts or bases to water slurries thereof. Reference to methods of treating or modifying starches may be found in "Starch Chemistry and Technology" vol. 1, by Whistler and Paschall, under the heading "Chemical Gelatinization" pages 304–306, published by the Academic Press.

The polymer may be comminuted to a particle size that permits ready dispersion in water, a particle size of 40 mesh or smaller size (e.g., 50 to 100 mesh) being preferred. The finer the mesh size, in general, (other conditions remaining constant) the faster the rate of gelation.

The salt employed to prepare the composition required to be employed in the practice of the invention can be a monovalent or polyvalent metal salt of an organic acid or of a complex metal-containing anion or the polyvalent metal salt of an inorganic or mineral acid or mixture of any such salts. The term polyvalent, as used herein means having a valence of two or more. The following salts are illustrative of those that may be used: $CaCl_2$, $MgCl_2$, $SrCl_2$, $FeCl_3$, $TiCl_4$, $SnCl_4$, $K_4P_2O_7$, $Mg(NO_3)_2$, $K_2C_2O_4$, $K_2(AlO_2)_2$, $KC_2H_3O_2$, $NH_4C_2H_3O_2$, $NaC_2H_3O_2$, $Ca(C_2H_3O_2)_2$, $Fe_2(SO_4)_3$, $Zn(NO_3)_2$, $K_2CO_3$, $CnSO_4$, $CoCl_2$, $Fe(NO_3)_3$, $AlCl_3$, $Al(NO_3)_3$, $K_2CrO_4$, $NH_4N{=}C{=}O$, $Na_3AlO_3$, $Mg(C_2H_3O_2)_2$, $$Fe(NH_4)_3(C_2O_4)_3$$

$FePO_4$, and the hydrates of such salts. The salt employed should have a water-solubility of at least about 10% by weight. It is preferable that a salt having a greater solubility and at a higher concentration than 10% be employed. Those salts forming hydrates in water are preferred, e.g., $K_2B_4O_7 \cdot 5H_2O$ or $CaCl_2 \cdot 6H_2O$ or admixtures of hydratable or hydrated salts or such salts mixed with unhydrated salts. The salt solution employed desirably has a vapor pressure or aqueous tension in pure water of not more than about 10 millimeters of mercury at the temperature at which the gelable composition is to be used. The higher the concentration of a given aqueous salt solution, the more the vapor pressure is lowered from that of pure water and the longer the gelation period. It can be seen that, by the judicious selection of a salt or mixture thereof and of the concentration thereof, a desirable gel time resulting from such admixture with a natural polymer, can be achieved and the admixture emplaced in accordance with the method of the invention.

According to one embodiment of the invention, a tough durable, more-or-less permanent plug or seal is made by maintaining the pH value of the aqueous natural polymer-salt mixture at at least six and preferably between about seven and twelve, inclusive.

Therefore, as guided by the teachings hereof, the proper selection of a salt or mixture thereof results in a pH value which is satisfactory for such permanent sealant plug, or by the addition of a small but effective amount of a base, e.g., an alkali metal hydroxide or alkaline earth hydroxide with a selected brine, a satisfactory pH value for a permanent seal may be provided.

According to a second embodiment of the invention, a temporary plug or seal is made by lowering the pH of the fluid aqueous natural polymer-salt mixture to a pH value of 5 or less, preferably to a pH value of between 1 and 4.

In this latter embodiment of the invention, the preferred natural polymer to employ is starch. An aqueous acidic solution, e.g. HCl, formic, acetic, solid powdered acid, e.g. oxalic, sulfanic, tartaric, or citric acid, is usually used to lower the pH value.

The following series of examples are illustrative of the practice of the invention:

SERIES ONE

The salt employed in this series was such as to give, or was adjusted to give, a pH value of between 6 and 12 and in most instances between 7 and 10. Aqueous solutions of some salts (e.g., those resulting from neutralization of relatively strong bases by relatively weak acids) have rather high pH values. The gelled polymer formed from such higher pH solutions according to the invention is of a tough, durable, resilient solid type, suitable for use where long life is desirable.

Either $CaCl_2$ or $ZnCl_2$ or a mixture of both was made up at 80° F. in this series of examples. Each solution was divided into two portions. One portion was retained at 80° F. and the other was heated at 150° F. A natural polymer was admixed with each portion of each of the aqueous solution and the resulting composition, so made, set aside, retaining one at 80° F. and the other at 150° F., and the time required for each composition to gel observed. The identification and concentration of the salts dissolved in water, the identication and amount of polymer admixed therewith, and the gel times are set forth in Table I.

The letter A in the table designates an aqueous solution prepared by admixing 28.5% of each of $CaCl_2$ and $ZnCl_2$ with water prior to admixing the polymer therewith. The letter B in the table designates an aqueous solution prepared by admixing 21.4% of each of $CaCl_2$ and $ZnCl_2$ with water prior to admixing the polymer therewith. All percentages in the table are by weight.

The gel time was determined by the standard gel test designated ASTM–D555–58, the gel time in said test being that taken as the lapse of time between admixture of the natural polymer with the solution in a specified size and weight test tube and the time at which the gelation of the contents had progressed sufficiently to permit the test tube, together with the contents, to be suspended from a glass rod, which had been immersed therein and then held in air suspended from the glass rod, in accordance with the standrad test designated ASTM–D555–58 as described in ASTM Standards (1958) Part 8, Sections 50 and 51, page 263, under "Gel Time of Drying Oils."

TABLE I.—GELATION TIMES OF NATURAL POLYMERS IN DENSE BRINES OF $CaCl_2$, $ZnCl_2$, OR MIXTURES THEREOF

| | Temp. | CaCl₂ | | | ZnCl₂ | | | 28.5% of each of—ZnCl₂ and CaCl₂ (A) or 21.4% of each (B) | | |
|---|---|---|---|---|---|---|---|---|---|---|
| | | Polymer, lb./gal. | Conc., percent | Gel time (hr.) | Polymer, lb./gal. | Conc., percent | Gel time (hr.) | Polymer, lb./gal. | Conc. | Gel time (hr.) |
| Gums: | | | | | | | | | | |
| Guar | 80 | 5 | 40 | 48 | 5 | 50 | 0.1 | 5 | B | 7–22 |
| | 150 | 5 | 40 | 0.1 | 5 | 60 | 0.1 | 5 | A | 1.75 |
| Tragacanth | 80 | 5 | 40 | 0.2 | 5 | 60 | 0.1 | 5 | A | 6 |
| | 150 | 5 | 40 | 0.1 | 5 | 60 | 0.1 | 5 | A | 0.1 |
| Karaya | 80 | 5 | 40 | 0.3 | 5 | 60 | 1.0 | 5 | A | 8–23 |
| | 150 | 5 | 40 | 0.1 | 5 | 60 | 0.1 | 5 | A | 0.1 |
| Locust bean | 80 | 5 | 40 | 10–22 | 5 | 60 | 0.4 | 5 | B | 0.4 |
| | 150 | 5 | 40 | 0.1 | 5 | 60 | 0.2 | 5 | A | 0.1 |
| Ghatti | 80 | 5 | 40 | 0.4 | 5 | 60 | 0.4 | 5 | A | 1.75 |
| | 150 | 5 | 40 | 0.1 | 5 | 60 | 0.2 | 5 | A | 0.1 |
| Proteins: Procase | 80 | 5 | 40 | 0.2 | 5 | 70 | 0.1 | 5 | A | 1 |
| | 150 | 5 | 40 | 0.1 | 5 | 70 | 0.1 | 5 | A | 0.1 |
| Celluloses: | | | | | | | | | | |
| Hydroxypropyl cellulose | 80 | 2.5 | 40 | 0.7 | 2.5 | 70 | (¹) | 2.5 | A | (¹) |
| | 150 | 2.5 | 40 | 0.1 | No test | | | No test | | |
| Hydroxyethyl cellulose | 80 | 5 | 40 | 0.2 | 4 | 70 | 1 | 5 | B | 0.1 |
| | 150 | 5 | 40 | 0.1 | 4 | 70 | 0.1 | 5 | A | 0.1 |
| Starches: | | | | | | | | | | |
| Corn starch | 80 | 5 | 40 | 48 | 5 | 60 | 7 | 5 | B | 1.5 |
| | 150 | 5 | 40 | 0.2 | 5 | 60 | 0.2 | 5 | A | 1 |
| Chlorinated corn starch | 80 | Not determined | | | 5 | 60 | 7 | 5 | B | 1.5 |
| | 150 | Not determined | | | 5 | 60 | 0.2 | 5 | A | 1 |
| Pregelatinized potato starch | 80 | 5 | 40 | 6 | 6 | 60 | 0.3 | Not determined | | |
| | 150 | Not determined | | | 6 | 60 | 0.1 | Not determined | | |
| Phosphate starch | 80 | 5 | 25 | 2.4 | 6 | 60 | 1 | 5 | B | 6–21 |
| | 150 | 5.5 | 40 | 4 | 6 | 60 | 0.1 | 5 | A | 5 |
| Tapioca | 80 | 8 | 40 | 24 | 7 | 60 | 6 | 7 | B | 0.5 |
| | 150 | 8 | 40 | 4 | 7 | 60 | 4 | 7 | A | 0.75 |

Table I shows that $CaCl_2$, $ZnCl_2$, or mixtures thereof in water with any of the natural polymers therein named, when employed in the prescribed proportions, produces a gelled composition within a desirable length of time.

SERIES TWO

The examples of Series One were repeated except that potassium acetate was the salt employed with a selected natural polymer, instead of salts named in Series One. The results are shown in Table II.

TABLE II.—GELATION TIMES OF NATURAL POLYMERS IN DENSE BRINES OF $CH_3COOK$

| | Temp. | Polymer, lb./gal. | $CH_3COOK$ Conc., percent | Gel time (hr.) |
|---|---|---|---|---|
| Gums: | | | | |
| Guar | 80 | 5 | 60 | 0.1 |
| | 150 | 5 | 70 | 0.1 |
| Tragacanth | 80 | 5 | 70 | 0.4 |
| | 150 | 5 | 70 | 0.1 |
| Karaya | 80 | 4 | 70 | 0.3 |
| | 150 | 4 | 70 | 0.1 |
| Locust bean | 80 | 5 | 70 | 0.4 |
| | 150 | 5 | 70 | 0.1 |
| Ghatti | 80 | 5 | 70 | 0.3 |
| | 150 | 5 | 70 | 0.1 |
| Proteins: Procase | 80 | 5 | 70 | 0.1 |
| | 150 | 2.5 | 70 | <0.1 |
| Celluloses: | | | | |
| Hydroxypropyl cellulose | 80 | 2.5 | 15 | 4 |
| | 150 | 2.5 | 15 | 0.1 |
| Hydroxyethyl cellulose | 80 | 5 | 70 | 0.1 |
| | 150 | 5 | 70 | <0.1 |
| Starches: | | | | |
| Corn starch | 80 | 5 | 70 | 6-21 |
| | 150 | 5 | 70 | 0.1 |
| Pregelatinized potato starch | 80 | 5.5 | 70 | 0.3 |
| | 150 | 5.5 | 70 | 0.1 |
| Phosphate starch | 80 | 5 | 70 | 24 |
| | 150 | 5 | 70 | 4 |
| Tapioca | 80 | 7 | 70 | 1 |
| | 150 | 7 | 70 | 0.1 |

Reference to Table II shows that potassium acetate in water when admixed with any of the natural polymers therein named, provides a satisfactory gelable composition for use in the method of the invention.

As aforesaid, compositions of the invention may be so prepared that they will degrade, as desired, in accordance with the pH value established, and thereby to provide a temporary seal.

SERIES THREE

The stage of such temporary seal at which it will degenerate to the extent that it will not serve as an effective shut-off is designated as the breakdown. In this series of tests, the pH of a $CaCl_2$ brine-polymer was adjusted downwardly by admixture therewith of hydrochloric acid. The gel times and breakdown times were ascertained. The length of gel time was taken as the lapse of time between mixing and the time when the test tube together with the contained composition could be suspended from the glass rod in accordance with ASTM-D555-58. The length of breakdown time was taken as the lapse of time between mixing and the time when the test tube and contained composition would again release from the glass rod.

TABLE III.—BREAKDOWN TIME SEALANT PREPARED USING NATURAL POLYMERS IN 40% $CaCl_2$ BRINE AND HYDROCHLORIC ACID

| | | 75° F. | |
|---|---|---|---|
| Polymer (5 lbs./gal. except as indicated by *) | 37% aqueous HCl solution by wt., percent | Gel time (hr.) | Breakdown time |
| Guar gum | 5 | 16 | 25 days. |
| Tragacanth | 5 | 0.1 | 70 days. |
| Locust bean | 5 | 0.1 | 20 days. |
| Ghatti | 5 | 0.1 | 61 hours. |
| Hydroxyethyl cellulose | 5 | 0.4 | 118 hours. |
| Hydroxypropyl cellulose * | 5 | 0.25 | Do. |
| Procase | 5 | 0.1 | 14 days. |
| Corn starch | 5 | 6 | 8 days. |
| Gelatin | 5 | 1 | 12 days. |
| Tragacanth | 0.5 | 0.2 | Over 30 days. |
| Locust bean | 0.5 | 8 | 30 days. |
| Ghatti | 0.5 | 0.4 | Do. |
| Corn starch | 0.5 | 40 | Do. |

* 3 pounds of polymer per gallon of brine were used in this test (as opposed to 5 pounds/gallon in the other tests).

Reference to Table III shows that the composition of the invention may be prepared as so to control the pH value thereof to effectuate a gel within a desirable time but which will subsequently degenerate autonomously.

SERIES FOUR

This series of examples was performed to demonstrate the suitability of the polymer composition of the invention to seal off a passageway for a relatively short period of time. The compositions were emplaced in a passageway and thereafter permitted autonomously to disintegrate after a time, as desired.

To carry out the examples of this series, portions of corn starch were admixed with separate aqueous solutions of various salts, or mixtures thereof, acceptable for use in the method of the invention, employing the weight of natural polymer per 100 milliliters of the aqueous solution of the selected salt as stated in Tables IV to VII, respectively. As indicated in the table, in some tests a small amount of 37% by weight of aqueous HCl was admixed with the composition to lower the pH value. In the tables there are shown the length of gel time and the length of time required to disintegrate the gel (designated breakdown time and abbreviated B.D.) for each test at 80° F., 100° F., 125° F., and 150° F. The test procedure used in this series is the same as that used in the tests of the above series.

TABLE IV.—GEL TIME AND BREAKDOWN (B.D.) TIME OF GEL OF AQUEOUS COMPOSITIONS OF SALTS HAVING DISPERSED THEREIN 75 GRAMS OF CORN STARCH IN 100 MILLILITERS OF AQUEOUS SALT SOLUTION AND SHOWING THE EFFECT OF HCl

| 100 grams of aqueous solution containing— | | 80° F. | | 100° F. | | 125° F. | | 150° F. | |
|---|---|---|---|---|---|---|---|---|---|
| 37% HCl | Salt | Gel time | B.D. time | Gel time | B.D. time | Gel time | B.D. time | Gel time | B.D. time |
| None | 40 grams $CaCl_2$ | 1 day | (¹) | 1½ hours | 60 days | 15 minutes | 30 days | 15 minutes | 15 days. |
| 1 gram | do | 16 hours | 12 days | 16 hours | 6 days | Broke down before completely gelled | | | |
| 3 grams | do | do | 10 days | do | 4 days | Broke down before completely gelled | | | |
| None | 60 grams $ZnCl_2$ | do | do | 1½ hours | 10 days | 20 minutes | 1 day | 15 minutes | 1 day. |
| 1 gram | do | do | do | do | 6 days | 30 minutes | 16 hours | 30 minutes | 10 hours. |
| None | 44 grams $FeCl_3$ | 2 hours | 1 day | 25 minutes | 1 day | 10 minutes | 1 day | 3 minutes | 1 day. |
| Do | 60 g. ammonium acetate | 16 hours | 32 days | 4 hours | 24 hours | 25 minutes | 20 days | 15 minutes | 17 days. |

¹ Indicates that the gel did not break down during a 60-day testing period.

TABLE V.—GEL TIMES AND BREAKDOWN (B.D.) TIME OF GEL OF COMPOSITIONS OF AQUEOUS SALT SOLUTIONS HAVING DISPERSED THEREIN 75 GRAMS OF POTATO STARCH IN 100 MILLILITERS OF AQUEOUS SALT SOLUTION AND SHOWING THE EFFECT OF THE PRESENCE OF HCl WHEN PRESENT

| Aqueous solution 100 grams containing— | | 80° F. | | 100° F. | | 125° F. | | 150° F. | |
|---|---|---|---|---|---|---|---|---|---|
| 37% HCl | Salt | Gel time | B.D. time | Gel time | B.D. time | Gel time | B.D. time | Gel time | B.D. time |
| None | 40 grams $CaCl_2$ | 16 hours | (¹) | 1 hour | (¹) | 20 minutes | 8 days | 10 minutes | 4 days. |
| 1 gram | do | do | 60 days | 35 minutes | 4 days | do | 1 day | Broke down before gelling. | |
| 3 grams | do | do | 40 days | 40 minutes | 2 days | 35 minutes | 1 hour | Broke down before gelling. | |
| None | 60 grams $ZnCl_2$ | do | 15 days | 30 minutes | 10 days | 7 minutes | 7 days | 7 minutes | 16 hours. |
| 1 gram | do | do | 10 days | 50 minutes | 4 days | 10 minutes | 2 days | 5 minutes | Do. |
| None | 44 grams $FeCl_3$ | 15 minutes | 15 days | 15 minutes | do | do | 10 hours | 10 minutes | 3 hours. |
| Do | 60 grams ammonium acetate. | NS | | NS | | 25 minutes | 40 days | do | 40 days. |
| Do | 10 grams ammonium isocyanate. | 25 minutes | 21 days | 20 minutes | 4 days | 10 minutes | 3 days | 5 minutes | 2 days. |
| Do | 35 grams $CaCl_2$ and 3 grams $AlCl_3$. | 4 hours | 3 days | | | Not tested | | | |
| Do | 24 grams NaCl, 3 grams $AlCl_3$. | 20 hours | 20 days | | | Not tested | | | |

¹ Indicates that the gel did not break during a 60-day testing period.

TABLE VI.—GEL TIME AND BREAKDOWN (B.D.) TIME OF GEL OF COMPOSITIONS OF AQUEOUS SALT SOLUTIONS HAVING DISPERSED THEREIN 60 GRAMS OF GUAR GUM IN 100 MILLILITERS OF AQUEOUS SALT SOLUTION AND SHOWING EFFECT OF THE PRESENCE OF HCl WHEN PRESENT

| 100 grams of aqueous solution containing— | | 80° F. | | 100° F. | | 125° F. | | 150° F. | |
|---|---|---|---|---|---|---|---|---|---|
| 37% HCl | Salt | Gel time | B.D. time | Gel time | B.D. time | Gel time | B.D. time | Gel time | B.D. time |
| None | 40 grams $CaCl_2$ | 48 hours | (¹) | 1½ hours | (¹) | 20 minutes | (¹) | 10 minutes | 20 days. |
| 1 gram | do | 24 hours | 40 days | 1½ hours | Not tested | 15 minutes | 19 days | do | 4 days. |
| 3 grams | do | 16 hours | 20 days | 30 minutes | 13 days | 5 minutes | 15 days | 5 minutes | 1 day. |
| None | 60 grams $ZnCl_2$ | 1¼ hours | (¹) | 20 minutes | 28 days | 10 minutes | 14 days | 10 minutes | 7 days. |
| 1 gram | do | 1 hour | 50 days | 15 minutes | 20 days | 15 minutes | 7 days | do | 6 days. |
| None | 44 grams $FeCl_3$ | 0.1 hour | 5 days | 0.1 hour | 4 days | 0.1 hour | 16 hours | 0.1 hour | 16 hours. |

¹ Indicates gel did not break down over a 60-day testing period.

TABLE VII.—GEL TIME AND BREAKDOWN (B.D.) TIME OF GEL OF COMPOSITION OF AQUEOUS SALT SOLUTIONS HAVING DISPERSED THEREIN 60 GRAMS OF KARAYA GUM IN 100 MILLILITERS OF AQUEOUS SALT SOLUTION AND SHOWING THE EFFECT OF THE PRESENCE OF HCl WHEN PRESENT

| 100 Milliliters of aqueous solution containing— | | 80° F. | | 100° F. | | 125° F. | | 150° F. | |
|---|---|---|---|---|---|---|---|---|---|
| 37% HCl | Salt | Gel time | B.D. time | Gel time | B.D. time | Gel time | B.D. time | Gel time | B.D. time |
| None | 40 grams $CaCl_2$ | 5 minutes | 6 days | 5 minutes | 3 days | 1 minute | 2 days | Not tested | |
| 1 gram | do | 1 minute | do | Not tested | | Not tested | | Not tested | |
| 3 grams | do | do | 3 days | Not tested | | Not tested | | Not tested | |
| None | 60 grams $ZnCl_2$ | 50 minutes | (¹) | 15 minutes | 6 days | 10 minutes | 4 days | 5 minutes | 2 days. |
| 1 gram | do | do | 7 days | do | do | do | 3 days | do | Do. |
| None | 44 grams $FeCl_3$ | 5 minutes | 8 days | 1 minute | do | 1 minute | 2 days | 1 minute | 16 hours. |
| Do | 50 grams $K_2CO_3$ | do | 6 days | 2 minutes | do | Not tested | | Not tested | |

¹ Indicates gel did not break down over a 60-day testing period.

Reference to the tests in Tables IV to VII shows that the duration of a seal made according to the invention may be controlled as desired by adjusting the pH value of the fluid composition before emplacement thereof.

SERIES FIVE

The purpose of this series of tests was to demonstrate the efficacy of the compositions of the invention by showing the high tensile strength thereof. Fluid compositions in this series of tests were prepared according to the recipes followed in the preparation of the compositions set out in Tables IV through VII and placed in a 12-inch long, 1-inch diameter, steel pipe. After the composition placed therein had fully gelled to a solid, hydraulic pressure (measured by a gauge) was applied to one end of the pipe and the gauge reading taken. The recorded pressure was that which was sufficient to result either in (1) some passage of liquid past or through the emplaced polymer composition, or (2) in moving the composition, as a slug, along the pipe. The pressures necessary to obtain the results designated as either (1) or (2) above are set forth in Table VIII.

Various salt solutions were prepared employing the percents by weight of salt given in Table VIII. Thereafter the weight of polymer given in Table VIII was admixed with 100 milliliters of each of the salt solutions previously prepared. The yield strength value was then observed and recorded.

Yield strength values of set polymer compositions, prepared by dispersing polymer material in 100 milliliters of aqueous salt solution, were obtained by pouring the dispersion so made into 12-inch long sections of 1-inch diameter pipe nipples, and curing it therein for 24 hours at room temperature (approximately 76° F.).

TABLE VIII

| Aqueous salt solution in percent by weight | Polymer in grams per 100 ml. of aqueous salt solution | Yield strength, p.s.i.g. |
|---|---|---|
| 35% $CaCl_2$ | 75 grams potato starch | 1,300 |
| Same | 75 grams corn starch | 1,150 |
| Do | 60 grams guar gum | 175 |
| 40% $CaCl_2$ | 60 grams karaya gum | 50 |
| 60% $ZnCl_2$ | 75 grams potato starch | 400 |
| Same | 75 grams corn starch | 450 |
| Do | 60 grams guar gum | 75 |
| Do | 60 grams karaya gum | 25 |
| 30% $MgCl_2$ | 75 grams potato starch | 100 |
| Same | 75 grams corn starch | 150 |

The results shown in Table VIII show that the composition so made displays adequate strength to be used in the method of the invention. That not all the natural polymers display the same extent of strength is useful because there are occasions when low tensile strength (e.g. when the set polymer may be moved along a channel) is desirable.

SERIES SIX

The examples of this series demonstrate further that the properties of the composition can be varied giving utility and operability of that embodiment of the invention wherein a more-or-less permanent or long lived type of seal is made (as opposed to one that possesses indigenous degradation when a temporary plug is needed).

The examples were conducted by admixing, with water, the salt or mixture thereof in the amount shown in Table IX below and admixing 100 milliliters of the so prepared solution with 75 grams of either corn starch or potato starch. The type of starch, observed rate of gelation of the composition, and the nature of the solid resilient resulting seal are also shown in Table IX. The terms used under the heading "Nature of Gelled Starch Composition" have the following general meaning: Pliable: very resilient; tacky: sticky or adhesive but sufficiently cohesive to remain integrated; doughy: readily deformable but less resilient than those designated as pliable; non-tacky: exhibiting no tendency to stick to other solid; hard: firm and tough but highly resilient.

Under "Gelation Rate" in Table IX "fast" means a complete gelled state was attained between about 2 and ten minutes; "medium" means a complete gelled state was attained in more than 10 minutes but not over one hour; "slow" means a complete gelled state was attained in more than one but not more than 4 hours; "very slow" means a complete gelled state was attained in between 4 and 24 hours. Reference to Table IX shows that the aqueous solutions of the salts set out therein, when admixed with either corn starch or potato starch, produce a very satisfactory sealant material. Such composition, which is fluid when first made but which gels to a solid within an operable but not excessively long gel period, is excellent for emplacing in cracks or fissures of masonry or geologic formations as for closing off channels therein or in conduits in the earth, including annuli of concentric cylindrical conduits, e.g. between pipes as tubing and casing or between a pipe or casing and the enclosing earthen borehole or tunnel.

TABLE IX

| Aqueous Solution in percent by weight | Type starch [1] | Gelation rate | Nature of gelled starch composition |
|---|---|---|---|
| 30% $MgCl_2$+10% $NH_4CNS$ | P | Fast at 80° F | Pliable, tacky. |
| Same as above | C | ...do... | Doughy, non-tacky. |
| 40% $CaCl_2$+10% $NH_4CNS$ | P | ...do... | Pliable, tacky. |
| Same as above | C | ...do... | Pliable, non-tacky. |
| 40% $CaCl_2$+10% $Ca(OH)_2$ | P | ...do... | Hard, non-tacky. |
| Same as above | C | ...do... | Do. |
| 60% $ZnCl_2$+3% $AlCl_3$ | P | ...do... | Pliable, tacky. |
| Same as above | C | ...do... | Doughy, non-tacky. |
| 25% $K_2CrO_4$ | P | Slow at 150° F | Hard, non-tacky. |
| Same as above | C | Very slow at 190° F | Do. |
| 10% $Na_3AlO_3$ | P | Medium at 120° F | Do. |
| Same as above | C | ...do... | Do. |
| 30% $NiCl_2$ | P | Slow at 120° F | Pliable, tacky. |
| Same as above | C | Slow at 190° F | Doughy, tacky. |

[1] P=potato starch; C=corn starch.

It can be seen by the test results as set out in Table IX that a specifically desired rate of gelation or gel time for a particular sealing job can be attained according to the invention by selecting the combination and concentration of the composition and controlling the temperature during gelation of the salt and natural polymer aqueous dispersions. In one specific mode of practicing the invention, in situ gelation may be desired and accomplished by preparing and emplacing a substantially uniformly mixed dry mixture of a selected salt and natural polymer and thereafter injecting water to effectuate a near instantaneous gel.

SERIES SEVEN

To demonstrate further the practice of the invention employing the composition described herein to plug off the flow of water or brine in a passageway, as demonstrated by the 1" diameter 1 foot long pipe section that the full effect of starch and varying concentrations of $CaCl_2$ was desired.

Accordingly, some of the examples of Tables IV and VI were repeated except that the percent of salts was increased to near saturation.

The test procedure followed was the same as that used in Series Three. The results are shown in Table X.

TABLE X

Yield Strength of Starch Seals made employing $CaCl_2$ in varying brine concentrations and containing in admixture therewith 75 grams of starch in 100 milliliters of the selected calcium chloride brine, and pouring the resulting gelable mixture into a 12-inch long nipple of 1-inch diameter pipe. All samples were cured at room temperature of 75° to 80° F. for 16 to 20 hours after gel time before hydraulic pressure was applied.

| Aqueous $CaCl_2$ solution in percent by weight | Type of starch | Gel time | Cure time in hours | Yield strength in p.s.i.g. |
|---|---|---|---|---|
| 25 | Potato | 10 minutes | 20 | 100 |
| 30 | do | 5 minutes | 20 | 600 |
| 32.5 | do | 10 minutes | 20 | 1,100 |
| 35 | do | 45 minutes | 20 | 1,600 |
| 40 | do | 16 hours | 30 | 1,800 |
| 42 | do | 30 hours | 48 | 2,300 |
| 25 | Corn | 30 minutes | 20 | 200 |
| 30 | do | 5 minutes | 20 | 600 |
| 35 | do | 15 minutes | 20 | 1,500 |
| 40 | do | 28 hours | 48 | 1,600 |

Reference to Table X shows that the concentration of the salt with a given weight of polymer in water exerts an appreciable effect upon the strength of the resulting gelled composition. Either the corn starch or potato starch results in stronger gels when used in higher concentrations of salt solutions. It also shows that the higher salt concentrations required longer gel times but when such polymer specimens were tested for strength, they were shown to be stronger in that they required appreciably greater pressures to break them. For example, where a 35% $CaCl_2$ brine containing 75 grams of potato starch suspended in 100 ml. of the brine (as shown in Table VIII) showed a yield strength of 1300 p.s.i.; when gelled at 76° F., a 42% $CaCl_2$ brine containing the same amount of potato starch required 2,300 p.s.i.g., to break through it under the same conditions. No appreciable difference was found in the gelled compositions made employing corn starch as opposed to those employing potato starch.

It can be seen that by the selection of a natural polymer or mixture thereof and a metal salt as defined hereinabove, or mixture of salts in an aqueous dispersion, in accordance with the gelation conditions, that a plugging composition can be made which meets the requirements of a large number of circumstances.

It can readily be seen that the sealing or plugging attained by emplacing the fluid dispersion, which subsequently gels autonomously, and which longevity can be controlled by the pH of the fluid, offers remarkable advantages for use in plugging off enroaching underground water or brine.

Having described our invention, what we claim and desire to protect by Letters Patent is:

1. The method of sealing off an opening in solid matter against fluid flow, which comprises emplacing in such opening the gelable fluid composition consisting essentially of (a) a natural polymeric material selected from the class consisting of (1) starches and chemically modified starches, (2) substantially nonionic water-insoluble cellulose ethers, (3) natural proteins selected from the class consisting of gelatins, soybean flour, and procase, and (b) an aqueous solution of a metal salt, containing at least 10% by weight of the metal salt, selected from the class consisting of the monovalent and polyvalent, hydrate-forming metal salts of organic acids and polyvalent, hydrate-forming metal salts of inorganic acids in sufficient relative proportions of components (a) and (b) to result in a pumpable slurry which sets autonomously to a resilient solid at ambient temperatures, and allowing the thus emplaced slurry to so set.

2. The method according to claim 1 wherein said metal salt in said composition employed is comprised at least in part of a calcium salt of an inorganic acid.

3. The method according to claim 1 wherein said metal salt in said composition employed is a mixture thereof.

4. The method according to claim 1 wherein said aqueous solution of said composition employed is substantially saturated with said metal salt at ambient tempertaure.

5. The method according to claim 1 wherein said natural polymeric material of said composition employed is present in an amount of between about 0.5 and 5.0 pounds thereof per gallon of said fluid composition at ambient temperature.

6. The method according to claim 1 wherein the pH value of said composition employed is controlled above 6 to insure a composition, which subsequently when gelled to a solid, is of long duration to provide a relatively long lived plug.

7. The method according to claim 1 wherein said natural polymeric material of said composition employed is starch.

8. The method according to claim 1 wherein an acid is admixed with said composition to lower the pH value prior to the setting thereof to a solid.

References Cited

UNITED STATES PATENTS

| | | | |
|---|---|---|---|
| 2,034,347 | 3/1936 | Loomis et al. | 166—294 |
| 2,253,297 | 8/1941 | Houghton et al. | 260—212 |
| 2,466,146 | 4/1949 | Baker | 252—316 X |
| 3,058,909 | 10/1962 | Kern | 166—283 |
| 3,096,284 | 7/1963 | Slate | 166—283 X |
| 3,208,524 | 9/1965 | Horner et al. | 166—294 |
| 3,241,612 | 3/1966 | Hiller | 166—294 X |
| 3,265,632 | 8/1966 | Leach | 252—316 |
| 1,394,653 | 10/1921 | Tressler | 106—125 |
| 2,111,204 | 3/1938 | Caesar | 106—210 |
| 2,439,833 | 4/1948 | Wagner | 166—294 |
| 3,378,070 | 4/1968 | Wessler et al. | 166—294 X |

STEPHEN J. NOVOSAD, Primary Examiner

U.S. Cl. X.R.

61—41, 45; 106—125, 169, 210, 294